United States Patent
Levin et al.

(10) Patent No.: US 9,151,847 B2
(45) Date of Patent: Oct. 6, 2015

(54) OPTICAL COUPLING TECHNIQUE FOR CONTIGUOUS MONOLITHIC SCINTILLATION CRYSTAL DETECTORS

(71) Applicant: The Board of Trustees of the Leland Stanford Junior University, Palo Alto, CA (US)

(72) Inventors: Craig Steven Levin, Palo Alto, CA (US); Ruud Vinke, Mountain View, CA (US)

(73) Assignee: The Board of Trustess of the Leland Stanford Junior University, Palo Alto, CA (US)

( * ) Notice: Subject to any disclaimer, the term of this patent is extended or adjusted under 35 U.S.C. 154(b) by 232 days.

(21) Appl. No.: 13/889,008

(22) Filed: May 7, 2013

(65) Prior Publication Data
US 2013/0299707 A1  Nov. 14, 2013

Related U.S. Application Data

(60) Provisional application No. 61/644,287, filed on May 8, 2012.

(51) Int. Cl.
*G01T 1/202* (2006.01)
*G01T 1/164* (2006.01)

(52) U.S. Cl.
CPC .............. *G01T 1/164* (2013.01); *G01T 1/1642* (2013.01); *Y10T 29/49002* (2015.01)

(58) Field of Classification Search
CPC ..... G01T 1/164; G01T 1/1642; G01T 1/2006; G01T 1/202; Y10T 29/49002
See application file for complete search history.

(56) References Cited

U.S. PATENT DOCUMENTS

2010/0270462 A1* 10/2010 Nelson et al. .............. 250/252.1

OTHER PUBLICATIONS

Vinke et al., "A method to achieve spatial linearity and uniform resolution at the edges of monolithic scintillation crystal detectors," Phys. Med. Biol., 59, 2014, pp. 2975-2995.

* cited by examiner

*Primary Examiner* — Mark R Gaworecki
(74) *Attorney, Agent, or Firm* — Beyer Law Group LLP

(57) ABSTRACT

Embodiments of the invention provide a high energy photon detector. A first scintillation crystal is provided. A first plurality of photosensors is on a first face of the first scintillation crystal, wherein the first plurality is at least two. A second scintillation crystal is provided. A second plurality of photosensors is on a first face of the second scintillation crystal, wherein the second plurality is at least two. An optical coupling interface is between a second face of the first scintillation crystal and a second face of the second scintillation crystal, wherein the optical coupling interface provides an optical transmission between the first scintillation crystal and the second scintillation crystal, so that the distribution of scintillation light created in one crystal is allowed to spread into the second crystal.

19 Claims, 13 Drawing Sheets k = 1    k = 3 k = 12

OPTICAL COUPLING TECHNIQUE FOR CONTIGUOUS MONOLITHIC SCINTILLATION CRYSTAL DETECTORS

CROSS REFERENCE TO RELATED APPLICATIONS

This application claims priority under 35 U.S.C. §119 from U.S. Provisional Patent Application No. 61/644,287, filed May 8, 2012, entitled METHOD TO OBTAIN UNIFORM POSITIONING ACCURACY, RESOLUTION, AND SENSITIVITY WITHIN MONOLITHIC SCINTILLATION DETECTORS FOR POSITRON EMISSION TOMOGRAPHY, which is incorporated herein by reference for all purposes.

FIELD OF THE INVENTION

Fields of the invention are radiation detection and medical imaging. Example applications of the invention include scintillation detectors in Positron Emission Tomography (PET) systems and Single-Photon Emission Computed Tomography (SPECT) systems.

BACKGROUND OF THE INVENTION

Positron emission tomography (PET) is a diagnostic imaging modality that is used to non-invasively measure the biodistribution of a radioactive tracer. In PET, a positron emitting bare radioactive isotope or an isotope that has been attached to a chemical molecule is injected into a patient or animal. A positron is emitted by the radioactive isotope and annihilates with an electron producing two photons in opposite directions. Each of the photons has approximately 511 keV of energy, corresponding to the mass of the positron and electron. These two annihilation photons escape the patient and interact in a scanner that is positioned around the patient.

A scanner is made of arrays of high energy photon detectors that convert interactions in the detector into electrical signals that are processed on a computer. An example of a high energy photon detector is a scintillation crystal that is connected to at least one optical photodetector such as a photomultiplier tube. The 511 keV annihilation photon can interact in the high-Z dense scintillation crystal, which in turn emits blue photons that bounce inside of the scintillation crystal. The blue optical photons then hit a photodetector which converts the light into an electrical signal. The electrical signal is then processed by analog and digital electronic circuits and is recorded as an event. The electronics process the signal and record the time, location of the crystal that was hit, and the energy of high energy annihilation photon to storage. In positron emission tomography, the two photons are paired to produce a line-of-response (LOR) of the interaction. These LORs are processed by image reconstruction algorithms to produce 3-D images of the distribution of the radiotracer.

SUMMARY OF THE INVENTION

Embodiments of the invention contain a high energy photon detector. A first scintillation crystal is provided. A first plurality of photosensors is on a first face of the first scintillation crystal, wherein the first plurality is at least two. A second scintillation crystal is provided. A second plurality of photosensors is on a first face of the second scintillation crystal, wherein the second plurality is at least two. An optical coupling interface is between a second face of the first scintillation crystal and a second face of the second scintillation crystal, wherein the optical coupling interface provides an optical transmission between the first scintillation crystal and the second scintillation crystal.

In another manifestation of the invention, a method of forming a high energy photon detector is provided. A first scintillation crystal and a second scintillation crystal are provided. At least two photosensors are attached on a first face of the first scintillation crystal. At least two photosensors are attached on a first face of the second scintillation crystal. An optical interface is applied on a second face of the first scintillation crystal. A second face of the second scintillation crystal is clamped to the optical interface at the second face of the first scintillation crystal.

The invention and objects and features thereof will be more readily apparent from the following detailed description and appended claims when taken in conjunction with the drawings.

DETAILED DESCRIPTION

Figure 1A:
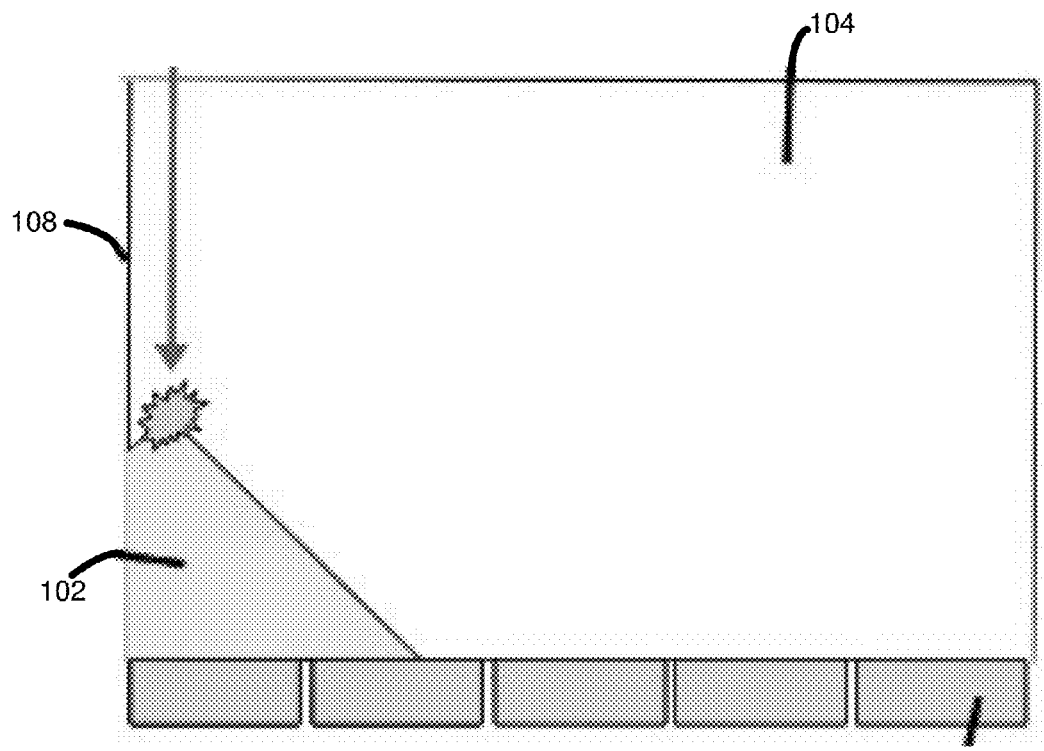
FIG. 1A is a schematical diagram of light compression in a monolithic crystal near the crystal edges.

Positron emission tomography (PET) detectors based on monolithic scintillation detectors have the potential to significantly increase photon sensitivity owing to increased fill factor, while reducing the costs and complexity of current commercial PET scanners, due to more simplified crystal manufacturing. Additionally, it has been shown that statistics-based positioning algorithms give excellent intrinsic spatial resolution for these detectors, while these detectors enable a different method for measuring photon depth-of-interaction (DOI) compared to discrete crystal array designs. FIG. 1A is a schematical diagram of light compression 102 in a monolithic crystal 104 near reflective crystal edges 108, Such monolithic crystal designs have the drawback of degraded spatial linearity and intrinsic spatial resolution near the crystal edges, due to scintillation light reflections off of the sides of the crystal, creating so-called 'edge-artifacts' that make the detector impractical for a clinical PET system. These edge artifacts get worse for thicker crystals intended for clinical PET systems. An embodiment of the invention allows the sides of the monolithic crystal to allow light to spread through the edges into adjacent optically coupled monolithic crystal detectors rather than reflecting off the edges.

Figure 1B:
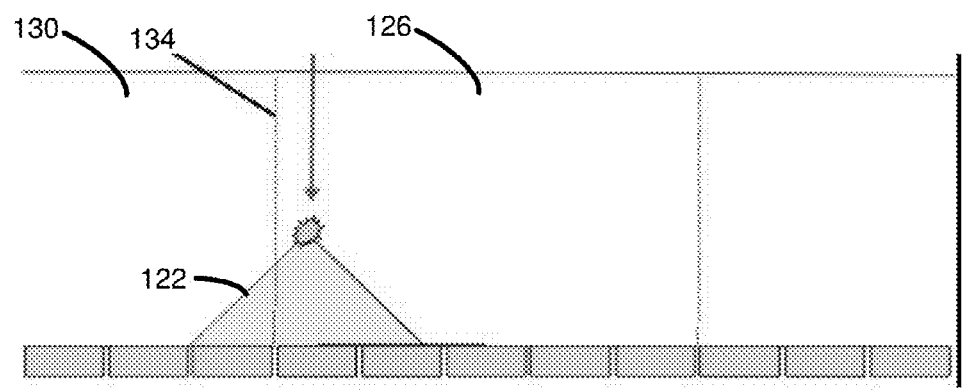
FIG. 1B is a schematical diagram of scintillation light spreading into an adjacent optically coupled monolithic crystal.

FIG. 1B is a schematical diagram of scintillation light 122 in a first monolithic crystal 126 spreading into an adjacent optically coupled second monolithic crystal 130, where an optical coupling interface 134 is between the first monolithic crystal 126 and the second monolithic crystal 130.

Detector Geometry

Figure 2A:
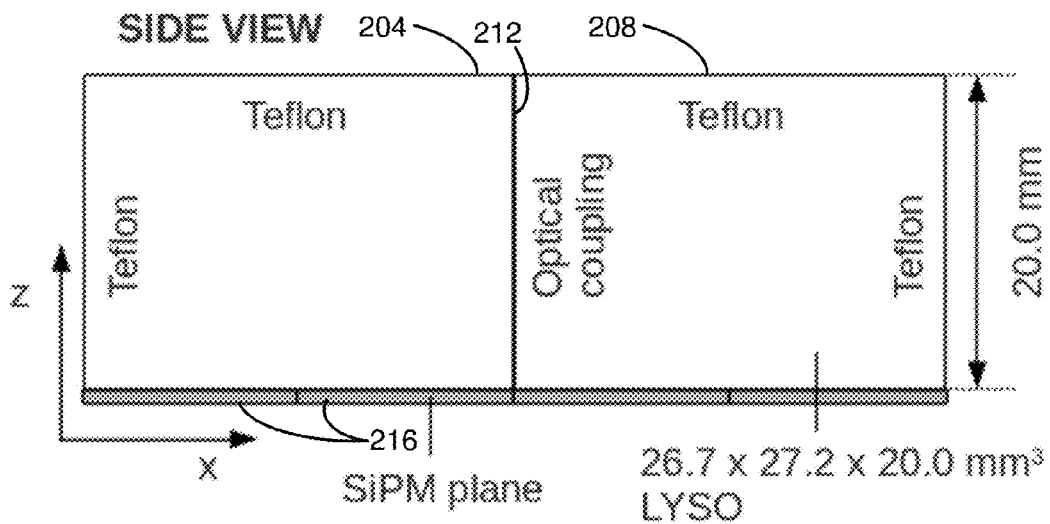
FIG. 2A is a side view of a first monolithic LYSO ($Lu_{0.8}Y_{0.2}SiO_5(Ce)$) crystal and a second monolithic LYSO crystal optically coupled to the first monolithic LYSO crystal by an optical interface, used in an embodiment of the invention.
Figure 2B:
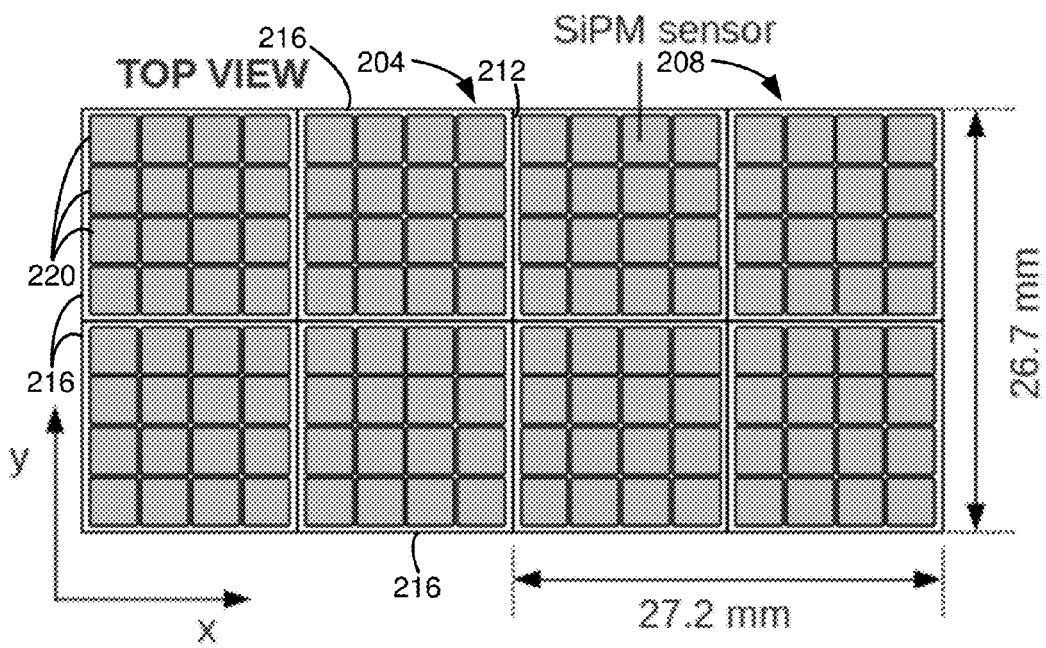
FIG. 2B is a top view of the photosensor arrays reading out the scintillation light.

FIG. 2A is a side view of a first monolithic LYSO ($Lu_{1.8}Y_{0.2}SiO_3(Ce)$) crystal 204 and a second monolithic LYSO crystal 208 optically coupled to the first monolithic LYSO crystal 204 by an optical coupling interface 212, used in an embodiment of the invention. The first monolithic LYSO crystal 204 and the second monolithic LYSO crystal 208 are each 26.7×27.2×20 mm$^3$. FIG. 2B is a top view of the first monolithic LYSO crystal 204 and the second monolithic LYSO crystal 208. Four Hamamatsu S11828-3344M monolithic silicon photomultiplier (SiPM) arrays 216 are placed on the bottom of the first monolithic LYSO crystal 204. Each Hamamatsu S11828-344M monolithic SiPM array 216 consists of 16 SiPM sensors 220, so that the first monolithic LYSO crystal 204 has 64 SiPM sensors 220. Similarly, the second monolithic LYSO crystal 208 has four Hamamatsu S11828-3344M monolithic SiPM arrays 216 placed on top, where each array has 16 SiPM sensors 220. Thus, each monolithic LYSO crystal 204, 208 has 64 SiPM sensors 220. The monolithic LYSO crystals 204, 208 are polished on all surfaces. Each SiPM array 216 is a 4×4 array of 3 mm×3 mm SiPM sensors 220, with a sensor pitch of 3.2 mm, corresponding to an array filling fraction of ~79%. The two monolithic LYSO crystals, 204, 208, are optically coupled together along one of their 26.7 mm×20 mm faces using an optical interface.

For modeling the scintillation light transport, the Monte Carlo simulation package Detect2000 was used. The optical coupling interface 212 between the two monolithic LYSO crystals 204, 208 was chosen to have refractive indices nC of 1.0 (air), 1.4, 1.5, 1.6, and 1.7, and thickness d of 50 µm. For the monolithic LYSO crystals 204, 208, the refractive index n was chosen to be 1.82. The optical grease between the monolithic crystals 204, 208 and SiPM arrays 216 had a chosen n of 1.5 and d of 50 µm.

To illustrate how the optical coupling interface affects the light transport, scintillation light spread functions (LSFs) were generated. For this purpose, the crystal top and side faces (i.e. the faces not coupled to the SiPM arrays or the neighboring crystal, were made perfectly absorbing for this particular simulation. This was done, because scintillation photons that would undergo (multiple) reflections off these faces if covered with a reflector, generate an almost uniform background LSF, which is superimposed onto the LSF from the 'direct', unscattered scintillation photons which carry most position information. As the purpose of this particular simulation is to give a visualization and qualitative understanding of how the optical coupling interface affects the light transport, only scintillation photons travelling directly towards the SiPM arrays and/or traversing or reflecting off the optical interface were tracked. Scintillation photons were generated at specific, fixed (x,y,z) locations inside the LYSO crystals and collected by the SiPM plane on a fine spatial grid with 200 µm×200 µm bins.

For the remainder of the simulations, scattered scintillation photons off the crystal top and side surfaces were also tracked. The crystal top and side surfaces were covered with a Teflon layer with d=500 µm and n=1.37, and a reflectivity of 92%. Between the crystal surfaces and the Teflon layer, a 10 µm air gap was defined with n=1.0. Each of the SiPM pixels was modeled as a silicon dioxide layer with d=20 µm and n=1.48. The 200 µm dead space between individual SiPM pixels was modeled as fully absorbing. A light yield (LY) of 26,000 photons/MeV was assumed for the LYSO crystal. For each of the SiPM pixels a photon detection efficiency (PDE) of 25% was assumed. With the ~79% array filling fraction, this is equivalent to a global effective PDE of ~20%.

Cramér-Rao Bound of Position Resolution

Before describing the noise model of the SiPM pixels 220 and the algorithm for the position reconstruction, it is at this point useful to evaluate the variation of the lower bound of the position resolution over the crystal extent. Since it was mentioned above that the 'edge-artifacts' are an intrinsic factor of monolithic LYSO crystal 204, 208 designs, these should be present independent of the amount of noise in the SiPM pixels and independent of the used position reconstruction algorithm. The goal is to reproduce these artifacts using as few assumptions as possible, to show that these artifacts are intrinsic to the monolithic crystal design, and cannot be resolved by introducing new positioning schemes.

For this simulation, a line pattern of scintillation points along the x-direction was defined at a fixed distance of 15 mm from the SiPM plane (constant z) and in the center of the crystal along the y-dimension (y=0). For each scintillation point, a constant number of scintillation photons were generated using the LY previously mentioned. With these considerations, the probability for detecting $\{m_1, m_2, \ldots, m_{128}\}$ scintillation photons in the corresponding SiPM sensors 220 for scintillation position x is then given by Poisson statistics (with the mean number of detected photons equal to the variance):

$$P[m_1, m_2, \ldots, m_{128}|x] = \prod_{i=1}^{128} \frac{f_i(x)^{m_i} e^{-f_i(x)}}{m_i!} \quad (1)$$

where $f_i(x)$ is the mean number of detected photons in the ith SiPM for scintillation position x. Alternately, given the distribution $\{m_1, m_2, \ldots m_{128}\}$, the probability that this distribution was generated at scintillation point x is given by the same equation. According to Maximum Likelihood (ML) estimation, the best estimate for the scintillation position x, given a certain distribution $\{m_1, m_2, \ldots, m_{128}\}$, is the one for which this probability is maximum:

$$\hat{x} = \arg_x \max P[m_1, m_2, \ldots, m_{128}|x] \quad (2)$$

For mathematical convenience, instead of P, the logarithm of P (ln P) can be maximized. The maximum can be found by calculating the root of the first derivative of ln P with respect to x:

$$\frac{\partial}{\partial x}\ln P[m_1, m_2, \ldots, m_{128} | x] = \sum_{i=1}^{128} \frac{m_i}{f_i(x)} \frac{\partial f_i(x)}{\partial x} - \sum_{i=1}^{128} \frac{\partial f_i(x)}{\partial x} = 0 \quad (3)$$

The Cramér-Rao bound $\sigma_{lb}$ sets a lower bound on the variance of an unbiased estimator. This means that, given a certain statistical model, the best obtainable resolution for estimating a model's parameter is given by $\sigma_{lb}$, in case the estimator is unbiased. $\sigma_{lb}$ defines the lower bound on the attainable position resolution. This means that any unbiased positioning algorithm will not give a better positioning resolution than $\sigma_{lb}$. This implies that any 'edge-artifact' showing up in the calculation, will show up in any positioning algorithm. $\sigma_{lb}$ can be calculated as follows:

$$\sigma_{lb} = \frac{1}{I(x)} \quad (4)$$

where the Fisher information I (x) is defined by:

$$I(x) = -E\left[\frac{\partial}{\partial x}\ln P[m_1, m_2, \ldots, m_{128} | x]\right] = \sum_{i=1}^{128} \frac{1}{f_i(x)}\left(\frac{\partial f_i(x)}{\partial x}\right)^2 \quad (5)$$

Here, E denotes the expected value, such that $E[m_i | x] = f_i(x)$.

$f_i(x)$ was calculated for each scintillation position x and SiPM pixel 220 i. In order to calculate $\partial f_i(x)/\partial x$, it is necessary to have an analytical model for $f_i(x)$ (The gradient cannot directly be calculated, since the $f_i(x)$ data is 'noisy' due to the finite number of events from which these were calculated.) In this embodiment, it was not attempted to derive an analytical model for the scintillation light transport for this particular crystal geometry. Rather, the $f_i(x)$ data were fitted with an 8th order polynomial:

$$f_i(x) \approx p_0 + p_1 x + p_2 x^2 + p_3 x^3 + p_4 x^4 + p_5 x^5 + p_6 x^6 + p_7 x^7 + p_8 x^8 \quad (6)$$

Smooth gradients $\partial f_i(x)/\partial x$ could then be obtained for each x and i from the polynomial approximation of $f_i(x)$ in Eq. 6. $\sigma_{lb}$ was then calculated along the crystal extent in the x-direction using the polynomial approximation in Eq. 6 for $f_i(x)$ and $\partial f_i(x)/\partial x$. This procedure was followed for several values of the refractive index of the coupling interface $n_C$. Although the $\sigma_{lb}$ values calculated with above method may not be exactly accurate, due to the approximation made in Eq. 6, the trend of the variation of $\sigma_{lb}$ along the crystal extent should still be observable.

Position Reconstruction

A 511 keV photon beam was oriented on one of the monolithic LYSO crystals 204, 208 with perpendicular incidence on the 27.2 mm×26.7 mm top crystal surface, and was placed on multiple locations on this crystal face using a grid with 2 mm grid spacing. GEANT4 was used to simulate photoelectric absorption and Compton scattering for the incoming annihilation photons. As stated above, the LY and PDE were set at 26,000 photons/MeV and 25%, respectively. An intrinsic energy resolution of $(\Delta E/E)$int of 11% FWHM at 511 keV was chosen for the monolithic LYSO crystals 204, 208. The signal broadening associated with the avalanche process in SiPMs due to optical crosstalk and after pulses is commonly expressed by the excess noise factor ENF:

$$(\Delta E/E)_{SiPM} = 2.355\sqrt{\frac{ENF}{PHE}} \quad (7)$$

where PHE is the number of primary generated photoelectrons in the sensor. In absence of SiPM multiplication noise, ENF=1, and $(\Delta E/E)_{SiPM}$ is described by pure Poisson statistics of the number of primary generated photoelectrons. ENF values have been modeled, consistent with experimental measurements for similar SiPM pixels 220. In addition, signal broadening due to electrical noise of the SiPM and associated preamplifier was modeled. A measurement of the RMS electronic noise $\sigma_{noise}$ of the signal baseline and the 511 keV pulse height M for a small LYSO scintillation crystal coupled to a single SiPM sensor at high SiPM bias voltage gave an SNR of about $M/\sigma_{noise}$=400. With the estimated 95% light collection efficiency $\epsilon$ of this crystal, and assuming a 25% PDE for this SiPM, it is estimated that this roughly translates to an electronic noise $\sigma_{noise}$ expressed in number of photons of 0.511 LY PDE $\epsilon$/SN R=7.9 photons. This value for $\sigma_{noise}$ was used for each of the 128 SiPM pixels 220 in the simulation.

For each beam position, scintillation events were clustered into 9 depth of interaction (DOI) regions, based on the detected energy E of the SiPM channel, which received the most light for that particular beam position, using a maximum likelihood clustering algorithm. The probability density function (PDF) of the detected energy $E_i$ of each SiPM channel i for a certain beam position (x,y) and DOI region could then be described by a simple Gaussian:

$$PDF_{Ei}(x, y, DOI) = \frac{1}{\sigma_i\sqrt{2\pi}} \cdot \exp\left[-\frac{(E_i - \mu_i)^2}{2\sigma_i^2}\right] \quad (8)$$

For each beam position (x,y), DOI region, and SiPM channel i, the mean $\sigma_i(x,y)$ and standard deviation $\sigma_i(x,y)$ of the detected energy $E_i$ were calculated. The $\sigma_i(x,y)$ and $\sigma_i(x,y)$ parameters were subsequently calculated on a fine grid of 0.2 mm spacing by bicubic spline interpolation for each DOI region. Given a set of detected energies $\{E_1, E_2, \ldots, E_{128}\}$ for a certain event, the probability that the interaction took place at (x,y,DOI) is then given by:

$$P(E_1, E_2, \ldots, E_{128} | x, y, DOI) = \pi_{i=1}^{128} PDF_{Ei}(x, y, DOI) \quad (9)$$

The maximum likelihood (ML) estimate of the coordinate (x,y,DOI) is then the one that maximizes this probability. The 3D interaction position for each event was reconstructed in this way, and point spread functions (PSFs) (i.e. reconstructed point source profiles) were set up for each beam position. To test the effect of reducing the number of readout channels on the position reconstruction, a 4:1 multiplexing ratio was used by summing the response of 4 neighboring SiPM pixels 220 for each event, thereby effectively forming 32 SiPM pixels 220 of 6 mm×6 mm size.

Time Resolution Estimation

It has been demonstrated before that monolithic scintillation crystals exhibit good timing performance for whole-body time-of-flight PET. Since monolithic crystals are proposed to be adjacently optically coupled, scintillation light transport and detection will not be confined to a single monolithic detector element, and this might thus result in a degraded timing performance. Through simulations the timing performance is compared for monolithic detectors in which scintillation light is 'lost' (for arrival time estimation) through optically connected interfaces with monolithic detectors in which the scintillation light is 'recaptured' with reflective surfaces. As the number of SiPM sensors involved in the arrival time estimation is kept the same between these two detector configurations, it is not important to model the effects of SiPM dark counts and electronic noise for the comparative study. For this calculation, scintillation photon arrival times were generated according to the Monte Carlo method. For each scintillation photon, an arrival time $t_{arriv}$ was calculated as follows:

$$t_{arriv} = t_e + t_{dps} + t_{pc} \quad (10)$$

where $t_e$ is the scintillation emission time, $t_{ps}$ the SiPM sensor 220 propagation time, and $t_{pc}$ the crystal propagation time. These times are thus all relative to the annihilation interaction time $t_{inter}=0$. $t_e$ and $t_{ps}$ were sampled according to the Monte Carlo method from the following probability density functions (PDFs):

$$PDF_{te}(t) = \frac{1}{\tau_d - \tau_r} \cdot \left( \exp\left[-\frac{t}{\tau_d}\right] - \exp\left[-\frac{t}{\tau_r}\right] \right) \quad (11)$$

$$PDF_{tps}(t) = \frac{1}{\sigma_{tts}\sqrt{2\pi}} \cdot \left( \exp\left[-\frac{(t-\mu_{tt})^2}{2\sigma_{tts}^2}\right] \right) \quad (12)$$

where $\tau_d$ and $\tau_r$ are the scintillation decay and rise time constants, $\sigma_{tts}$ the single photon transit time spread of the SiPMs, and $\mu_{tt}$ the average transit time of the SiPMs. $PDF_{te}$ and $PDF_{tps}$ are thus a biexponential and Gaussian PDF, respectively. $\tau_d$ and $\tau_r$ were chosen to be 43.8 ns and 90 ps for LYSO, respectively. $\sigma_{tts}$ was chosen to be 120 ps, while $\mu_{tt}$ just acts as a constant time delay for each scintillation photon, not contributing to the timing resolution, and was thus arbitrarily chosen. The crystal propagation time $t_{pc}$ in Eq. 10 was generated for each scintillation photon using the Detect2000 simulation package and detector geometry described above with $n_C=1.7$. In addition, this detector geometry for $t_{pc}$ was modified to have optical coupling interfaces instead of Teflon reflective surfaces at the crystal side surfaces in the x-direction (to simulate the light loss to other neighboring crystals in a full ring of optically coupled crystals). As mentioned above, the light yield LY was chosen to be 26,000 photons/MeV, the intrinsic energy resolution ($\Delta E/E$)int 11% FWHM, and the PDE 25%. The set of values for $t_{arriv}$ in Eq. 10 were sorted in time to produce for each event i the ordered set of arrival times $\{t_i1, t_i2, \ldots, t_{iNi}\}$, where $N_i$ is the number of detected scintillation photons for event i.

Single Photon Triggering

The timing resolution as a function of photon trigger index j could then be calculated from the set of jth earliest detected photons $\{t_1j, t_2j, \ldots t_{Mj}\}$, where M is the total number of events. The timestamps were histogrammed and the FWHM resolution was determined from a Gaussian fit.

Multiple Photon Triggering

The timing resolution was calculated as well when for each event i timestamps $T_{ij}$ were based on the earliest j photon triggers:

$$T_{ij} = \frac{\sum_{k=1}^{j} t_{ik}}{k} \quad (13)$$

The FWHM timing resolution was then determined from a Gaussian fit.

ML Estimation of the Interaction Time

Figure 3A:
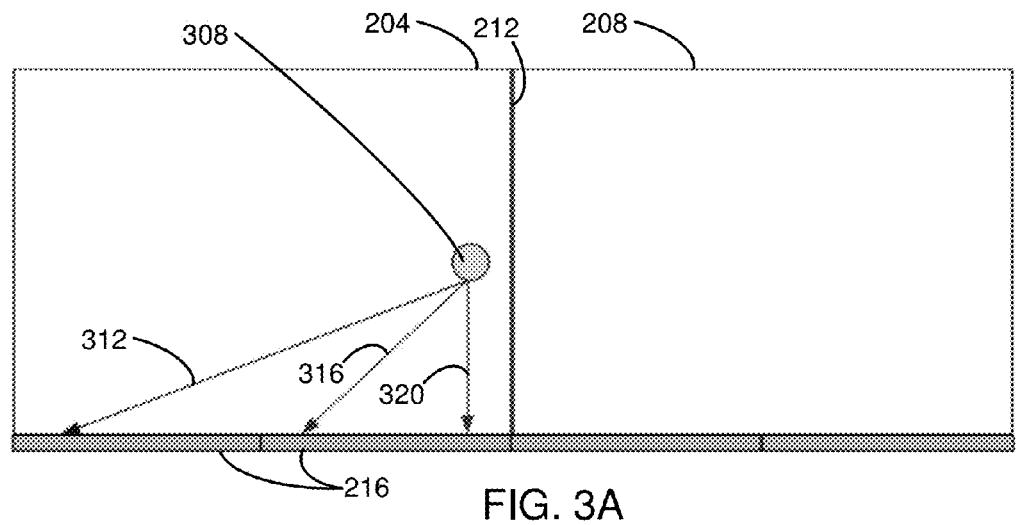
FIG. 3A is a side view of the monolithic LYSO crystals and SiPM arrays, where the interaction position (x,y,z)=(−1,0,10) mm is indicated, which was used for the timing analysis.
Figure 3B:
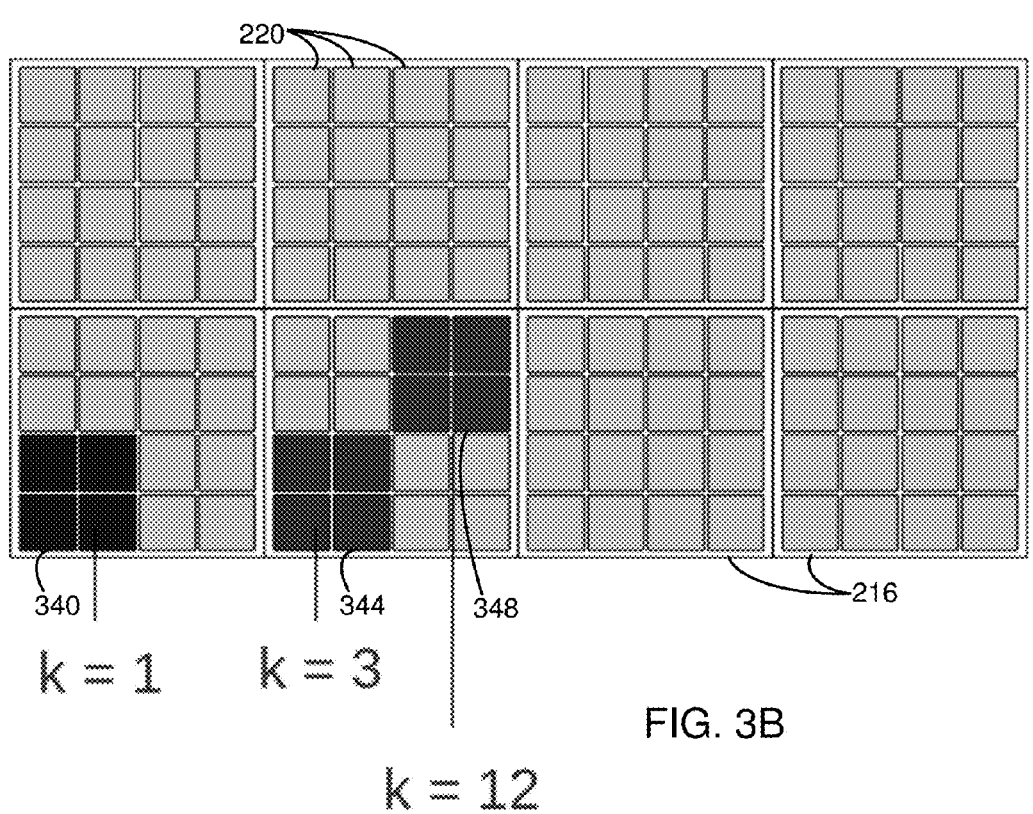
FIG. 3B is a top view of the monolithic LYSO crystals and SiPM arrays, showing 3 sensor regions which were used for the timing analysis.
Figure 3C:
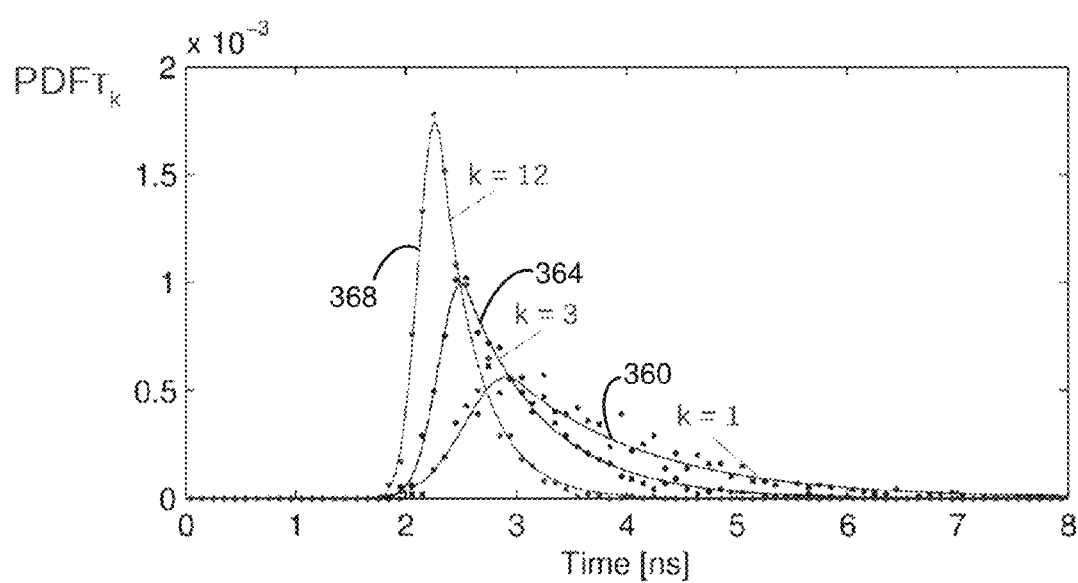
FIG. 3C shows the fitted PDFs for the 3 sensor regions.

This method of estimating the interaction time based on the first photon arrival time PDF for each sensor region was included in these simulations. The SiPM sensor map of FIG. 2B was divided into 32 sensor regions. FIG. 3A is a side view of the monolithic LYSO crystals 204, 208 and SiPM arrays 216, where a multiple of scintillation events 308 occur within the first monolithic LYSO crystal 204 at a fixed position. The scintillation events 308 create a set of first detected photons 312 directed to a sensor region k=1, a set of first photons 316 directed to a sensor region k=3, a set of first photons 320 directed to sensor region k=12. FIG. 3B is a top view of the SiPM arrays 216, showing the k=1 sensor region 340, the k=3 sensor region 344, and the k=12 sensor region 348. Each sensor region k contains 4 SiPM sensors 220 and records for each scintillation event i the timestamp of the earliest detected scintillation photon $t_i1$ for that particular sensor region, here denoted as $T_k$. For a certain annihilation photon interaction position inside the LYSO crystal, $T_k$ was histogrammed for each sensor region to obtain the PDFs. The PDFs of the 3 sensor regions 340, 344, 348 are shown in FIG. 3C with curve 360 showing the PDF for sensor region k=1 340, curve 364 showing the PDF for sensor region k=3 344, and curve 368 showing the PDF for sensor region k=12 348. The PDFs were fitted by a Gaussian with exponential tail:

For $t \leq (\mu_k + \Delta_k)$ (14)

$$PDF_{Tk}(t) = N \cdot \exp\left[-\frac{(t-\mu_k)^2}{2\sigma_k^2}\right]$$

Otherwise:

$$PDF_{Tk}(t) = N \cdot \exp\left[-\frac{\Delta_k(t-\mu_k-\Delta_k/2)}{\sigma_k^2}\right]$$

where N is the normalization constant:

$$N = \frac{1}{\sqrt{\frac{\pi}{2}} \cdot \sigma_k \cdot \left(1 + \text{erf}\left[\frac{\Delta_k}{\sqrt{2}\sigma_k}\right]\right) + \frac{\sigma_k^2}{\Delta_k} \cdot \exp\left[-\frac{\Delta_k^2}{2\sigma_k^2}\right]} \quad (15)$$

with erf being the Gauss error function. $\Delta_k$ defines the start of the exponential tail with respect to $\mu_k (\Delta_k>0)$.

Fitted PDFs of $T_k$ according to Eq. 14 are shown in FIG. 3C for the 3 sensor regions 340, 344, 348 (out of 32). The interaction position was set at (x, y, z)=(−1,0,10) mm (1 mm distance from the optical coupling 212, 10 mm distance from the SiPM sensor array 216).

The fitted parameters $\mu_k$, $\sigma_k$, and $\Delta_k$ could then be used to estimate the interaction time $t_{inter}$ for each event from this particular gamma interaction position using the ML method. Given a set of earliest timestamps $\{T_1, T_2, \ldots, T_{32}\}$ for a certain event, the probability that the interaction took place at time $t_{inter}$ is given by:

$$P(T_1, T_2, \ldots, T_{32}|tinter) = \pi_{k=1}^{32} PDF_{T_k}(T_k - t_{inter}) \quad (16)$$

The ML estimate of $t_{inter}$ is then the one that maximizes this probability. Since $T_k$ in Eq. 14 is defined relative to $t_{inter}$, the ML estimate of $t_{inter}$ should result in values around 0. $t_{inter}$ was calculated for multiple scintillation events and the full width at half maximum (FWHM) timing resolution was then obtained from a Gaussian fit.

Results

Light Spread Functions (LSFs)

Figure 4A:
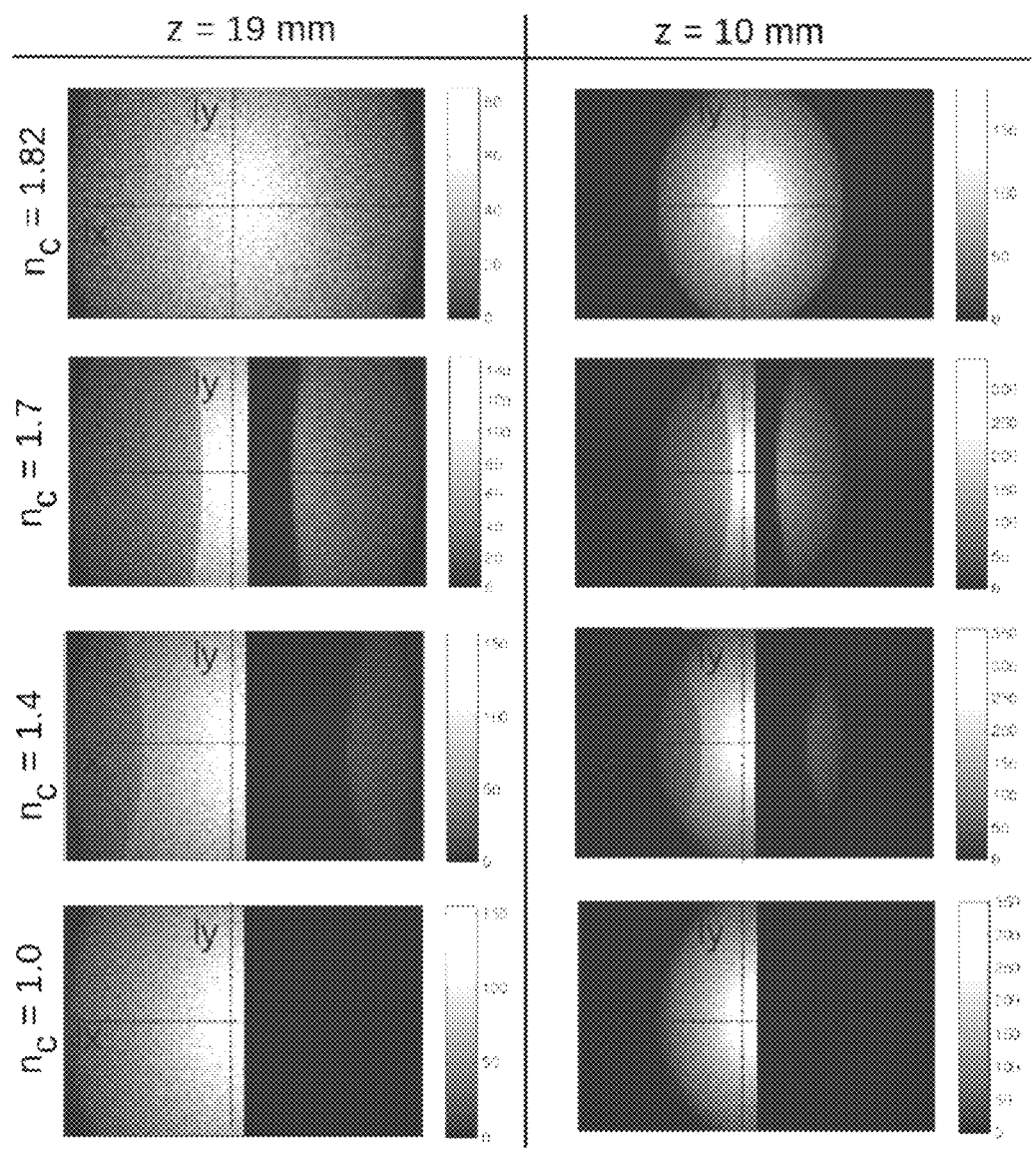
FIG. 4A shows light spread functions (LSFs).
Figure 4B:
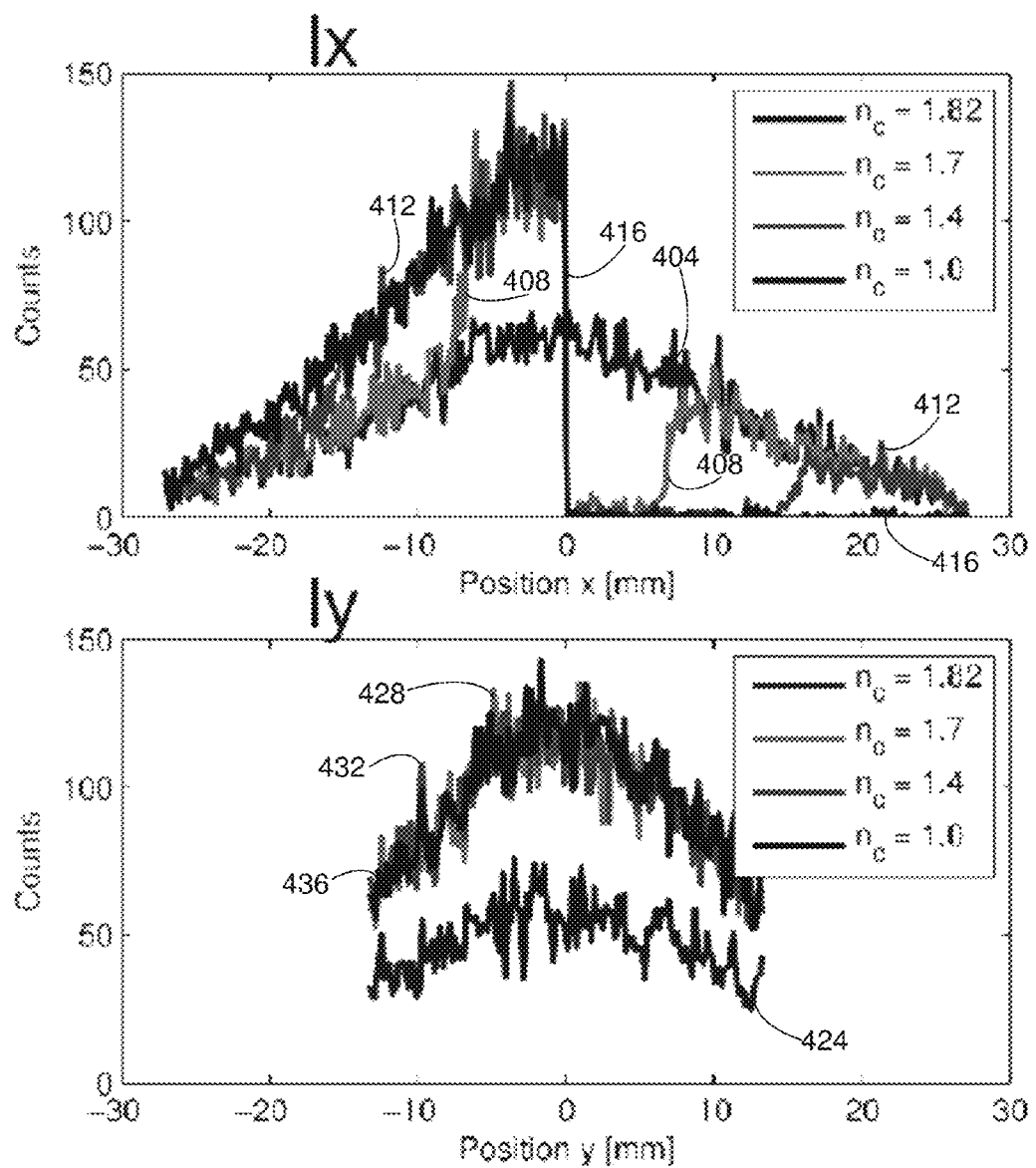
FIGS. 4B-C show the line profiles lx and ly of the LSFs.
Figure 4C:
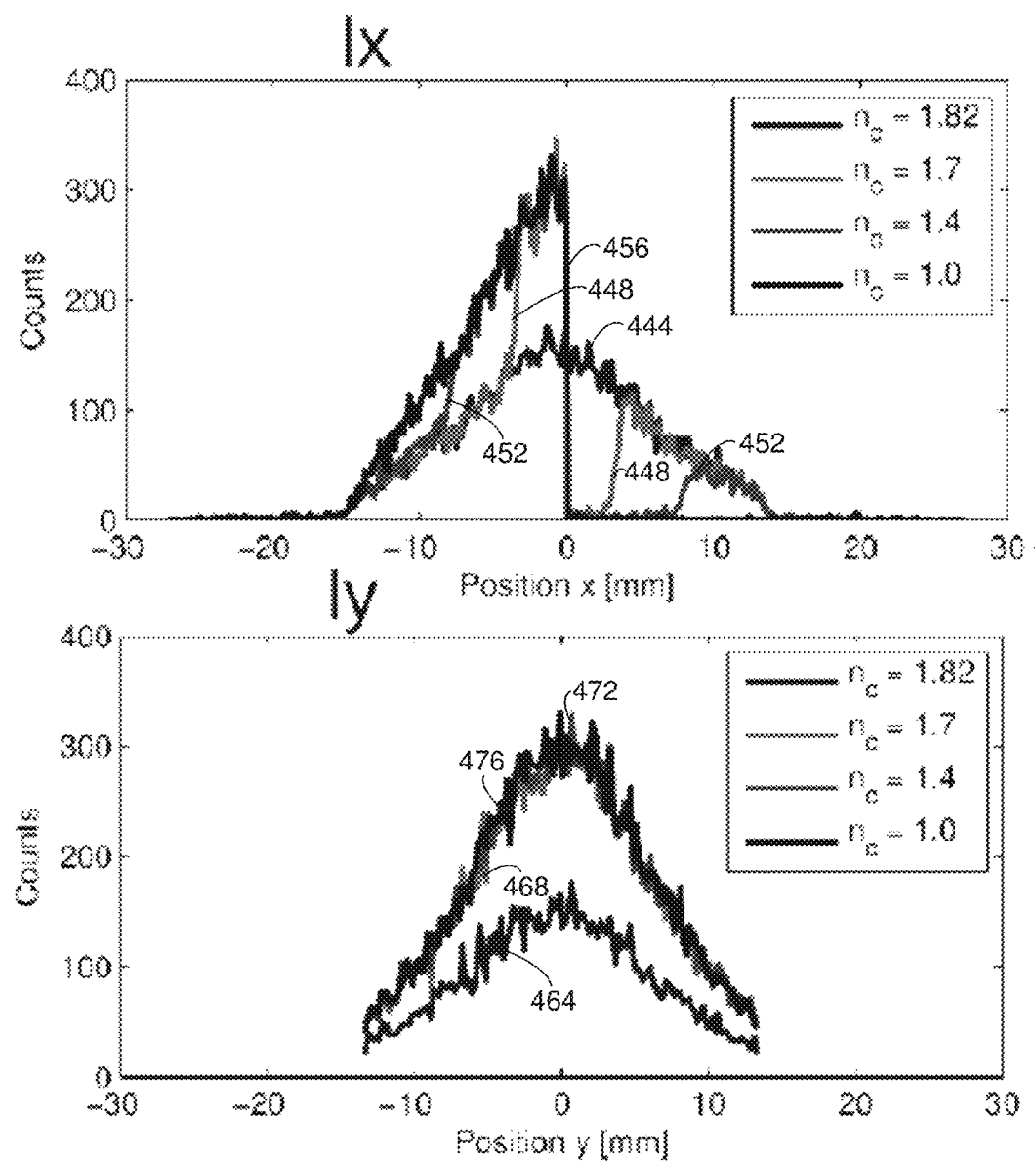

FIG. 4A shows the LSFs according to the procedure described above. The left column shows LSFs for a fixed point source at $(x, y,)=(-0.5, 0, 19)$ mm (19 mm distance from sensor, 0.5 mm from optical coupling interface), for the right column $(x, y,)=(-0.5, 0, 10)$ mm (10 mm distance from sensor, 0.5 mm from optical coupling interface). The LSFs are shown for refractive indices of the optical coupling interface $n_C=\{1.82, 1.7, 1.4, 1.0\}$. Each LSF is an image of 1,000,000 collected 'direct photons'. FIGS. 4B-C show the line profiles lx and ly of the LSFs, indicated by the dotted lines in FIG. 4A. FIG. 4B is a graph of curves for lx when z=19 mm and $n_C$=1.82 404, $n_C$=1.7 408, $n_C$=1.4 412, and $n_C$=1.0 416 and a graph of curves for ly when z=19 mm and $n_C$=1.82 424, $n_C$=1.7 428, $n_C$=1.4 432, and $n_C$=1.0 436. FIG. 4C is a graph of curves for lx when z=10 mm and $n_C$=1.82 444, $n_C$=1.7 448, $n_C$=1.4 452, and $n_C$=1.0 456 and a graph of curves for ly when z=10 mm and $n_C$=1.82 464, $n_C$=1.7 468, $n_C$=1.4 472, and $n_C$=1.0 476.

It is apparent that total internal reflection occurs for a photon travelling towards the optical coupling interface whenever the incidence angle $\theta i$ exceeds the critical angle $\theta crit = \arcsin(n_C/n_{LY\_SO})$, where $n_C$ and $n_{LY\_SO}$=1.82 are the refractive indices of the optical coupling interface and the LYSO crystal, respectively. The amount and pattern of the light that is transmitted to the neighboring crystal depends on the difference in refractive index of the crystal and coupling interface. This is more quantitatively illustrated in the lx line profiles in FIGS. 4B-C. Furthermore, it is apparent that the light pattern is more spread out for interactions that are far from the pixel array. In this context, it is noted that for the z=19 mm interaction point, the ly line profiles show that only part of the direct light is captured due to the limited crystal extent of 26.7 mm in the y-direction. The LSFs in FIG. 4A are only shown light directed towards the SiPM plane, as explained above. For actual incoming 511 keV annihilation photons, the patterns look different due to (multiple) reflected scintillation photons from the crystal edges and multiple annihilation photon interactions (instead of single interactions) due to Compton scattering, and only a finite number of scintillation photons are generated (LY is 26,000 photons/MeV for LYSO).

Cramér-Rao Bound of Position Resolution

Figure 5:
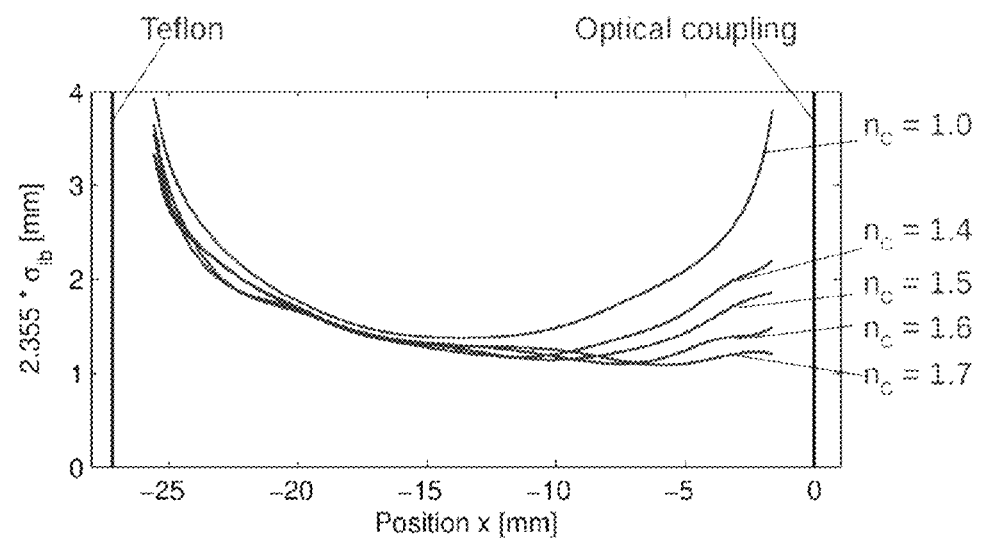
FIG. 5 shows Cramér-Rao bound $\sigma_{lb}$ profiles.

FIG. 5 shows the Cramér-Rao bound $\sigma_{lb}$ profiles from Eqs. 4-5 for varying values of the refractive index of the coupling interface $n_C$. The profiles were generated for a line profile of scintillation points in the x-direction at y=0 and z=15 mm distance from the SiPM plane. It is apparent that the position resolution deteriorates near the Teflon edge, as well as near the coupling interface for low values of $n_C$, creating the so-called 'edge-artifacts'. When using the optical coupling technique between crystals with a coupling interface of high refractive index $n_C$, FIG. 5 shows that these artifacts can be reduced substantially. Note that in these profiles, $\sigma_{lb}$ was calculated from a polynomial fit approximation of $f_i(x)$ (see Eq. 6), to obtain smooth gradients from the 'noisy' $f_i(x)$ values.

Position Reconstruction

Figure 6A:
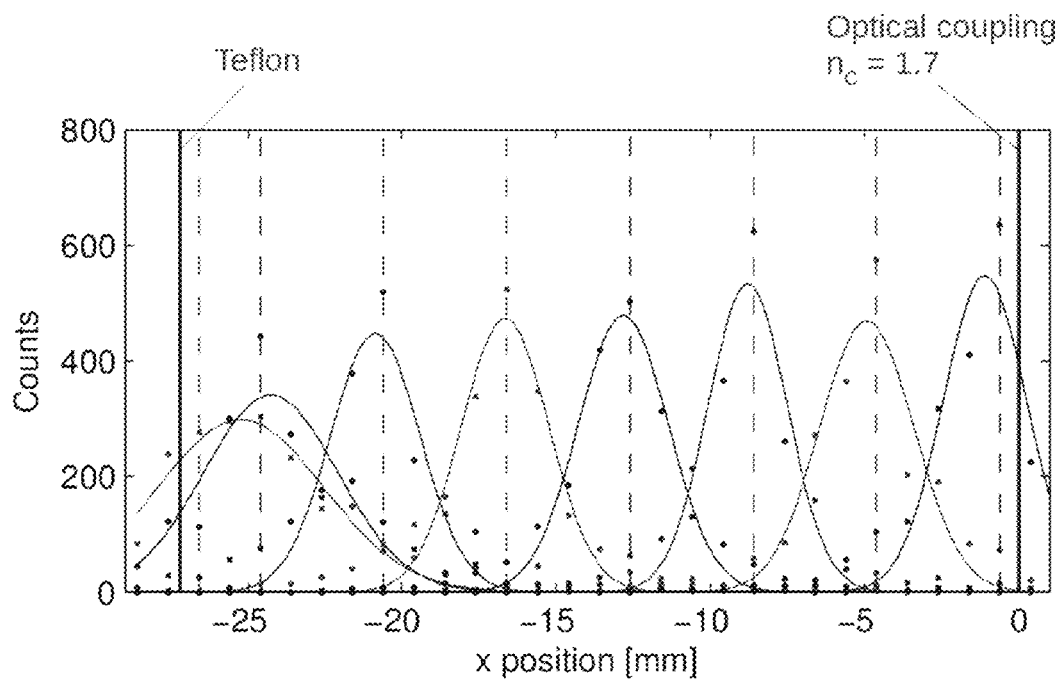
FIG. 6A shows simulated point spread functions (PSFs).
Figure 6B:
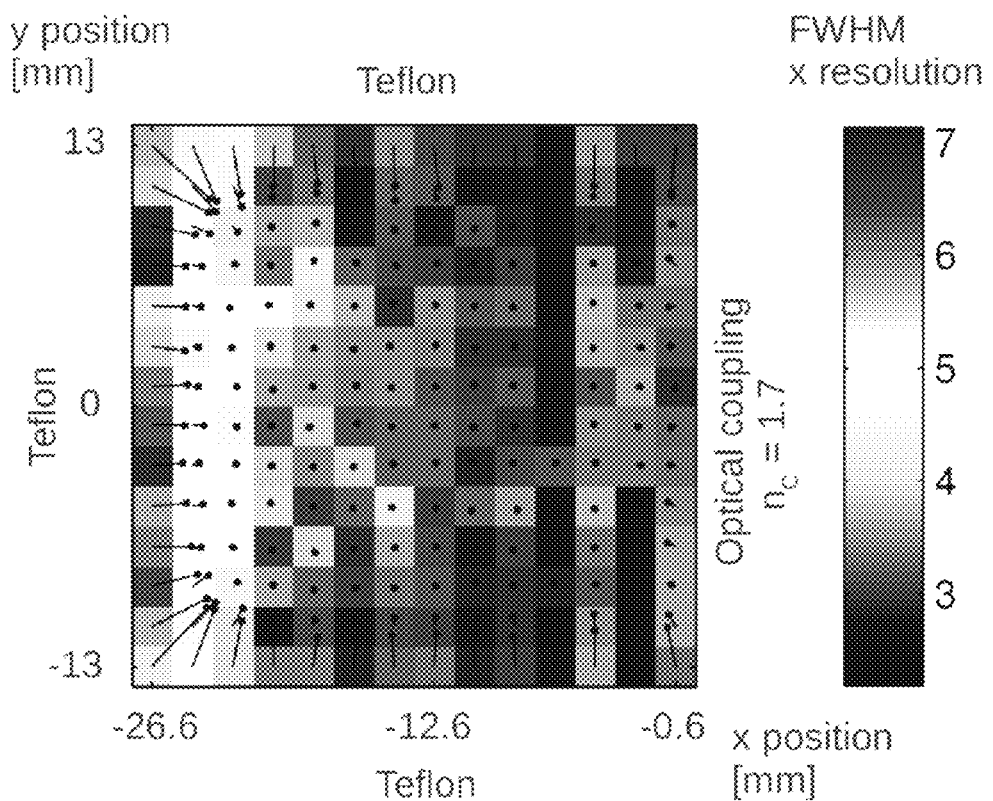
FIG. 6B is a PSF FWHM resolution map for the monolithic crystals.

FIG. 6A shows simulated point spread functions (PSFs), using Eq. 9, along dimension x for crystal with reflective surfaces for beam positions $(x,y)=(x_i, 1)$, where $x_i=\{-26.6, -24.6, -20.6, -16.6, -12.6, -8.6, -4.6, -0.6\}$ for ENF=2.7 and $\sigma_{noise}$=7.9 photons per channel. Optical coupling interface is located at x=0. Teflon reflection edge at x=−27.2. The dashed lines indicate the beam positions. Solid lines represent Gaussian fits to the PSFs. FIG. 6B is a PSF FWHM resolution map for ENF=2.7 and $\sigma_{noise}$=7.9 photons per channel. The shading indicates the FWHM position resolution in the x-direction. The dark lines indicate the deviation of the position centroids from the true beam position as obtained from the Gaussian fits (i.e. the bias in the position reconstruction).

All 128 SiPM sensors 220 were used for the reconstruction. Near the crystal edges with Teflon surfaces, the edge-artifacts show up with a bias in the reconstruction and a deteriorated resolution compared to the center region. Near the crystal edge that is optically coupled with $n_C$=1.7 to the adjacent crystal, the FWHM resolution in the x-direction is comparable to the center region. Unlike FIG. 5, where the goal was to reproduce the edge-artifacts using as few assumptions as possible, FIG. 6B contains the effects of Compton scattering, intrinsic energy resolution of the crystal, interactions exponentially spread out over the z-direction, and SiPM pixel noise. Note that the $\sigma_{lb}$ curve for $n_C$=1.7 and z=15 mm in FIG. 5 shows similar behavior for the variation of the x-resolution along the x-dimension.

Figure 7A:
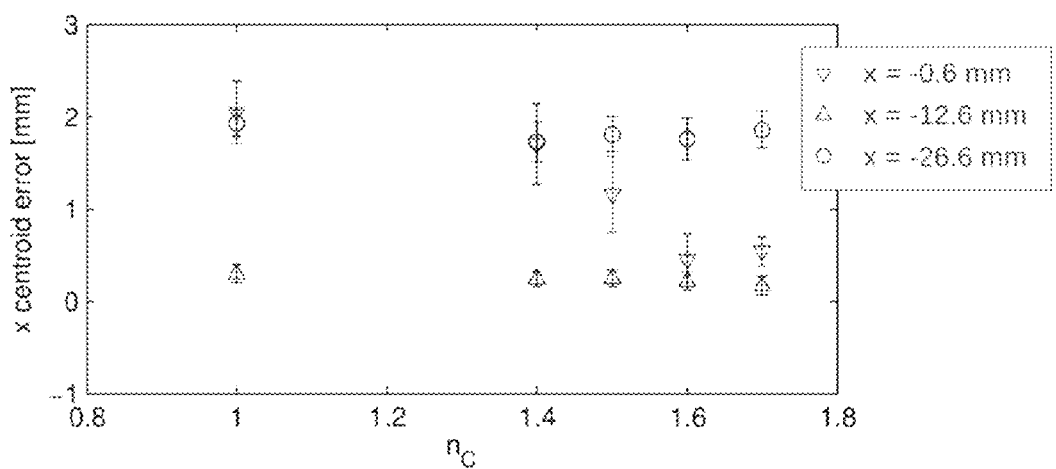
FIG. 7A shows absolute error of PSF x-position centroids as a function of refractive index of the optical coupling interface $n_C$ for beam positions close to the optical coupling interface, in the center of the crystal, and close to the Teflon reflection edge.
Figure 7B:
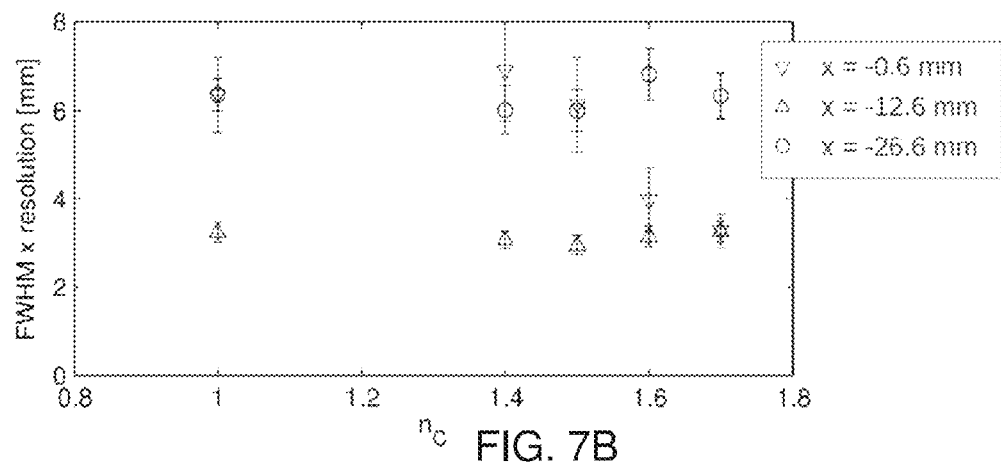
FIG. 7B shows PSF FWHM position resolution in the x-direction as a function of nC for the same beam positions as in FIG. 6A.

FIG. 7A shows the absolute error of PSF x-position centroids as a function of refractive index of the optical coupling interface $n_C$ for beam positions close to the optical coupling interface, in the center of the crystal, and close to the Teflon reflection edge: $(x,y) = (-0.6, y_i)$, $(-12.6, y_i)$, and $(-26.6, y_i)$, where $y_i=\{-13, -11, \ldots, 13\}$. ENF=2.7 and $\sigma_{noise}$=7.9 photons per channel. Error bars indicate the 95% confidence bounds. FIG. 7B shows PSF FWHM position resolution in the x-direction as a function of $n_C$ for the same beam positions as in FIG. 7A. Error bars indicate the 95% confidence bounds.

It is apparent that the optical coupling technique only works for coupling media that have a high refractive index. The range of $n_C$ values for which the position resolution and bias is comparable between the center region and the region near the optical coupling interface depends on the noise level of the SiPM pixels. For the chosen noise levels in FIGS. 7A-B the position performance in these two regions is comparable for $n_C \geq 1.6$. For lower values of $n_C$, the positioning bias and resolution becomes comparable to regions close to the Teflon reflection edge.

Table 1 gives PSF FWHM position resolution in the x-direction. Center: beam position $(x,y)=(-12.6, 1)$. Coupling interface: beam position $(x,y)=(-0.6, 1)$. 32 ch indicates 4:1 channel multiplexing ratio (number of SiPM elements to readout channels). $n_C$=1.7.

The positioning resolution worsens for higher noise values, as expected. For a 20 mm thick crystal with SiPM pixel arrays coupled to one crystal face, a ~3.6 mm and ~3.9 mm FWHM resolution is obtained at the center and near the optical coupling interface, respectively, for the chosen electrical and multiplication noise levels of $\sigma_{noise}$=10.0 and ENF=4.0. This is degraded to ~4.1 mm and ~5.0 mm FWHM at the center and near the optical coupling interface, respectively, when multiplexing the SiPM pixels by applying a 4:1 multiplexing ratio.

| | Center FWHM x resolution [mm] | Coupling edge FWHM x resolution [mm] |
|---|---|---|
| ENF = 1.0; | 2.2 ± 0.1 | 1.6 ± 0.1 |
| ENF = 4.0; | 3.6 ± 0.4 | 3.9 ± 0.6 |

-continued

|         | Center<br>FWHM ×<br>resolution [mm] | Coupling edge<br>FWHM × resolution [mm] |
|---------|---|---|
| ENF = 1.0; | 2.7 ± 0.2 | 2.5 ± 0.3 |
| ENF = 4.0; | 4.1 ± 0.2 | 5.0 ± 0.7 |
| ENF = 2.7; | 3.4 ± 0.3 | 3.2 ± 0.4 |

Timing Resolution

From the Detect2000 simulations it was found that for interaction position (x, y, z)=(−1, 0, 10) mm, the crystal light collection efficiency ε was ~51% for the crystal with optical interfaces $n_C$=1.7 at the x-ends, ~25% of the scintillation photons escaped through the optical interfaces, and ~24% of the photons were absorbed. For the crystal with Teflon surfaces at the x-ends, ε was ~65%, and ~35% of the photons was absorbed.

Figure 8A:
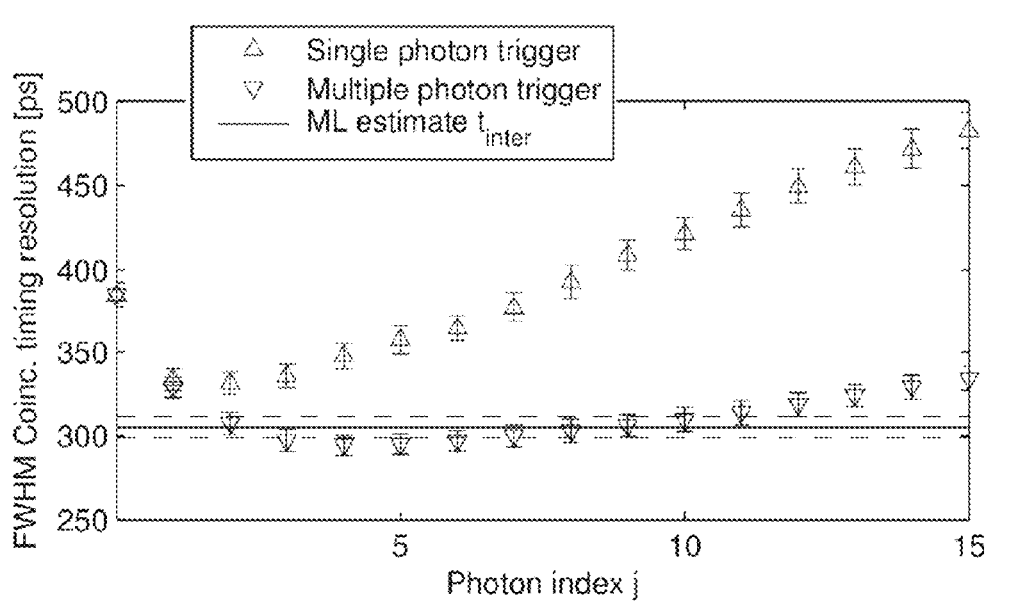
FIG. 8A shows the calculated timing resolutions profiles for crystal with reflective Teflon x-end surfaces for interaction position (x,y,z)=(−1, 0, 10) mm FIG. 8B similar as FIG. 7A, but for the crystal with optical interfaces at the x-ends.
Figure 8B:
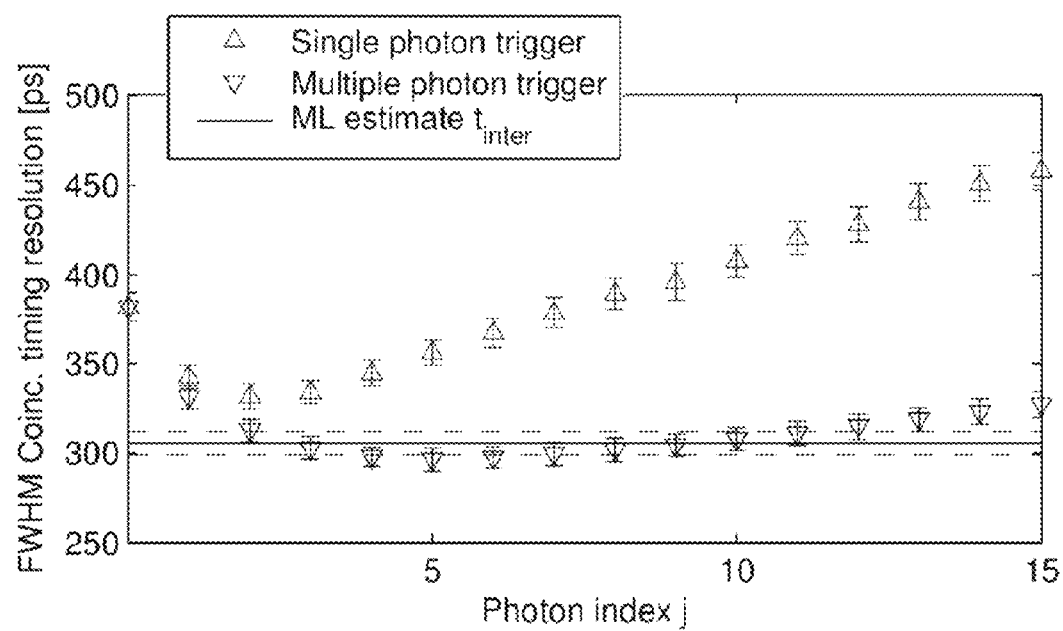

FIG. 8A shows the calculated timing resolutions profiles for crystal with reflective Teflon x-end surfaces for interaction position (x,y,z)=(−1, 0, 10) mm, according to the methods previously described. Error bars indicate the 95% confidence bounds from the Gaussian fits. The dotted lines indicate the 95% confidence bounds for the timing resolution of the ML estimate. For the ML method, the PDFs are shown for the 3 SiPM pixel regions 340, 344, 348 in FIG. 3B. For FIG. 8B, the same procedure has been followed as for FIG. 8A, but for the crystal with optical interfaces at the x-sides. The figures show that the timing resolution for the crystal with open optical interfaces at the x faces is similar compared to the crystal with Teflon surfaces at the x side faces. The figures further show that the timing resolution is improved when using multiple photon trigger levels. The ML method for estimating the interaction time based on the SiPM pixel arrival time PDFs results in a similar timing resolution as compared to the method with multiple trigger levels.

FIGS. 5 and 7A-B show that the edge artifacts in monolithic crystal detectors may be substantially reduced when using optical coupling interfaces with high refractive indices $n_C$ that closely match the refractive index of the scintillation crystal. In FIG. 5, the Cramér-Rao bound $\sigma_{lb}$ was calculated along the crystal extent. Table 1 shows that the positioning resolution worsens for higher noise values, as expected. When applying a 4:1 channel multiplexing ratio to reduce system cost and complexity, the positioning resolution is further degraded. At high noise levels of ENF=4.0 and $\sigma_{noise}$=10.0, the 4:1 channel multiplexing ratio gives a position resolution of 4.1 mm and 5.0 mm FWHM at the center and near the coupling interface with $n_C$=1.7, respectively, which may still be acceptable for whole-body PET.

It could be argued that black absorbing crystal surfaces could be used instead of reflective surfaces to partially reduce the edge artifacts. However, there will still remain a jump in refractive index when a scintillation photon propagates from the scintillation crystal towards the black absorbing medium. This implies that total internal reflection will still occur whenever the incidence angle of the scintillation photon impinging on the black absorbing medium exceeds the critical angle, as defined above. Simulations with perfectly absorbing black paintings have been performed, but also in these simulations the edge-artifacts showed up.

An example of a coupling layer with a high refractive index is Meltmount 1.704 with a refractive index $n_C$ varying between 1.725 and 1.759 in the 400 nm to 486 nm wavelength range at 25° C. Meltmount 1.704 has a yellowish color due to absorption of blue light. However, the absorption length at 420 nm for this optical glue is specified to be 4.7 mm, and the optical layer between the crystals can be made very thin in the micron range by attaching neighboring crystals, such that there should be minimum absorption inside the optical glue. Another optical glue is naphrax with an $n_C$ of 1.68 and absorption length of 1.2 mm at 420 nm wavelength. The attaching may be by clamping or gluing or any method that holds the surfaces the crystals close enough to provide an optical coupling, which allows scintillation photons to pass from one crystal to another.

FIGS. 7A-B show that the degradation in timing resolution due to the loss of scintillation photons to neighboring crystals may be minimal. This means that the photons escaping through the optical interfaces at the x sides only carry limited timing information, and that on average these photons would be detected at the later stages during the scintillation event if reflective surfaces would have been used to recapture these 'lost' photons. The figure further shows that the timing resolution is improved when using multiple photon trigger levels.

It is believed that pulse pile-up would not be an issue in a ring of optically interconnected monolithic crystals. Since there is a refractive index jump from the crystals towards the SiPM pixels (1.82 to about 1.48, not taking the optical interface between the crystals and SiPMs into account), scintillation photons will reflect off and not enter SiPMs in neighboring crystals whenever the incidence angle θi exceeds the critical angle θcrit=arcsin(1.48/1.82)=~54°. Furthermore, appropriate lower energy thresholds on SiPM signals would ensure only those SiPMs contributing to the LSF would be used in the event positioning, thus mitigating pulse pileup between adjacent optically connected crystals.

In a ring of optically interconnected monolithic crystals, the monolithic crystals would have a tapered (trapezoid) shape, such that there is no dead space between the monolithic crystal detectors, thereby maximizing sensitivity. The taper angle of the monolithic crystals inside this ring is given by $\theta_{taper}$=360°/(2 $n_{cryst}$), where $n_{cryst}$ is the number of monolithic crystals. For a ring with high $n_{cryst}$ (like in whole-body scanners), $\theta_{taper}$ is small, and the rectangular shape approximation for the monolithic crystals can be made, as verified in simulations.

With the optical coupling scheme good spatial linearity and resolution can be achieved at the edges of optically interconnected monolithic crystals. With this technique, monolithic scintillation detectors can provide good positioning and timing performance at reduced complexity compared to current detectors used in whole-body time-of-flight PET.

Example System

Figure 9:
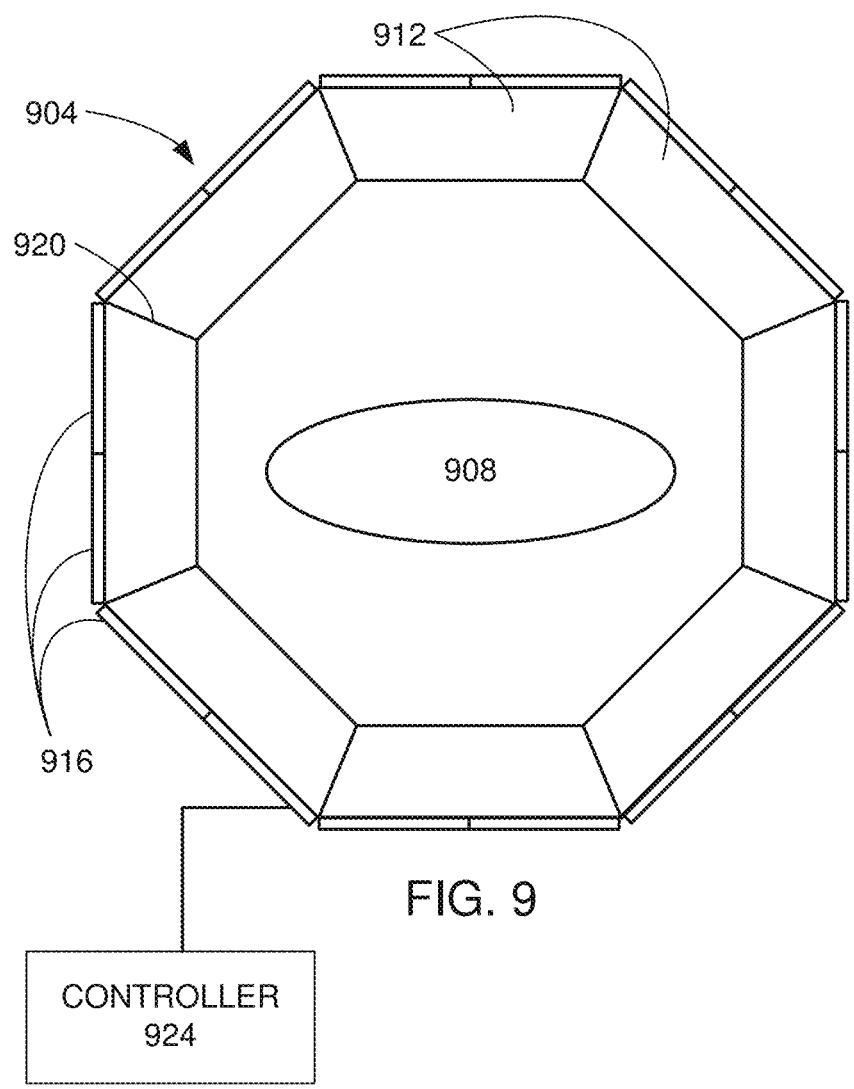
FIG. 9 is a schematic cross sectional view of a PET scanner with tapered monolithic crystals with a patient.

FIG. 9 is a schematic cross sectional view of a PET scanner 904 with a patient 908. The PET scanner 904 comprises a plurality of monolithic scintillation crystals 912. Although in this example, eight monolithic scintillation crystals 912 form a ring of the PET scanner 904, in other embodiments a larger number of monolithic crystals 912 may be used to form a ring or cylinder. The phrase "ring or cylinder" includes embodiments where the crystals form a ring and cylinder. In this example, a gap of less than 100 microns is between faces of adjacent monolithic scintillation crystals 912, where the gap is filled with an optical coupling interface 920 between adjacent monolithic scintillation crystals 912. On an outer surface of each monolithic scintillation crystal 912 are SiPM arrays 916. Signal processing devices, such as a controller 824, are connected to the SiPM arrays 916.

Figure 10:
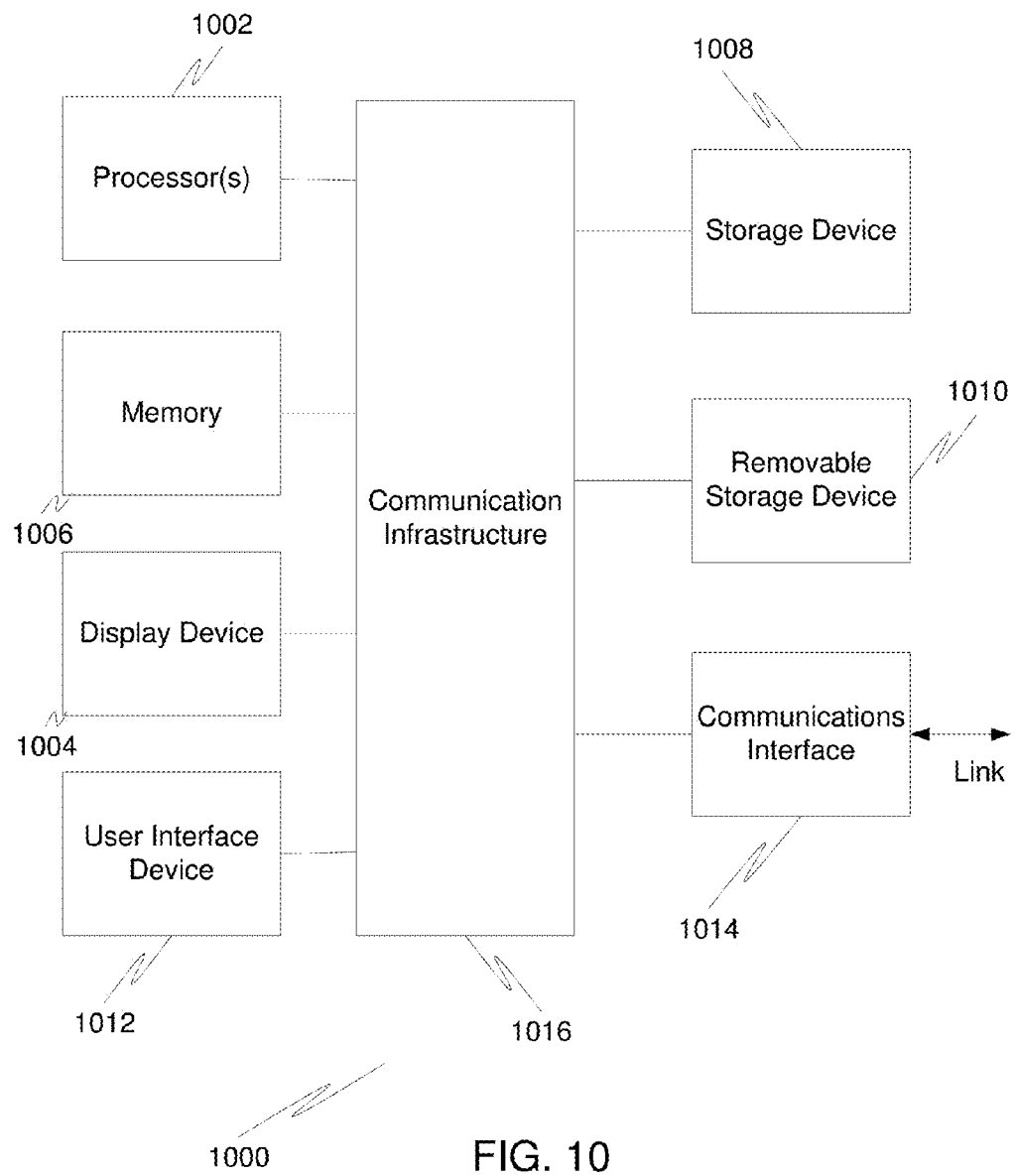
FIG. 10 is a high level block diagram showing a computer system, which may be used to provide a controller.

FIG. 10 is a high level block diagram showing a computer system 1000, which may be used to provide the controller 924. The computer system may have many physical forms ranging from an integrated circuit, a printed circuit board, and a small handheld device up to a computer. The computer system 1000 includes one or more processors 1002, and further can include an electronic display device 1004, a main memory 1006 (e.g., random access memory (RAM)), storage device 1008 (e.g., hard disk drive), removable storage device 1010 (e.g., optical disk drive), user interface devices 1012 (e.g., keyboards, touch screens, keypads, mice or other pointing devices, etc.), and a communication interface 1014 (e.g., wireless network interface). The communication interface 1014 allows software and data to be transferred between the computer system 1000 and external devices via a link. The system may also include a communications infrastructure 1016 (e.g., a communications bus, cross-over bar, or network) to which the aforementioned devices/modules are connected.

Information transferred via communications interface 1014 may be in the form of signals such as electronic, electromagnetic, optical, or other signals capable of being received by communications interface 1014, via a communication link that carries signals and may be implemented using wire or cable, fiber optics, a phone line, a cellular phone link, a radio frequency link, and/or other communication channels. With such a communications interface, it is contemplated that the one or more processors 1002 might receive information from a network, or might output information to the network in the course of performing the above-described method steps. Furthermore, method embodiments of the present invention may execute solely upon the processors or may execute over a network such as the Internet in conjunction with remote processors that shares a portion of the processing.

The term "non-transient computer readable medium" is used generally to refer to media such as main memory, secondary memory, removable storage, and storage devices, such as hard disks, flash memory, disk drive memory, CD-ROM and other forms of persistent memory and shall not be construed to cover transitory subject matter, such as carrier waves or signals. Examples of computer code include machine code, such as produced by a compiler, and files containing higher level code that are executed by a computer using an interpreter. Computer readable media may also be computer code transmitted by a computer data signal embodied in a carrier wave and representing a sequence of instructions that are executable by a processor.

Operation

In operation, in a PET scanner 904, a positron is emitted by the radioactive isotope and annihilates with an electron producing two annihilation photons in opposite directions. Each of the annihilation photons has 511 keV of energy. These two annihilation photons escape the patient 908 and interact with the PET scanner 904 that is positioned around the patient 908. Each high energy annihilation photon is absorbed in a monolithic scintillation crystal 912, which converts the annihilation photons into a larger number of lower energy scintillation photons, which may be detected by the SiPM arrays 916. The optical coupling interface 920 between adjacent monolithic scintillation crystals 912 allows some lower energy photons to pass from one monolithic scintillation crystal 912 to adjacent monolithic scintillation crystals 912.

The output from the SiPM arrays 916 may pass to other electronic devices to obtain depth of interaction, arrival time, and energy. This information from a multiple of events is used to generate a tomographic image using mathematical algorithms.

By providing an optical coupling interface between adjacent monolithic scintillation crystals, this embodiment is able to achieve spatial linearity and uniform resolution at the edges of the monolithic scintillation crystal.

Preferably, the optical coupling interface is provided by filling a gap between adjacent monolithic scintillation crystals with an optical gel with an index of refraction, comparable to the index of refraction of the monolithic scintillation crystals. Preferably, the monolithic scintillation crystals are held adjacent to each other. More preferably, the monolithic scintillation crystals are held adjacent to each other so that a gap between the adjacent monolithic scintillation crystals is no more than 100 microns. More preferably, the gap is no more than 50 microns. Most preferably, the gap is no more than 10 microns. Preferably, the monolithic scintillation crystals are clamped together. In other embodiments other photosensors may be used instead of SiPM pixels. In other embodiments of the invention, a photosensor array may be on an inside surface of the monolithic scintillation crystals. Since the depth of interaction is more often closer to the inside surface of the monolithic scintillation crystal than the outer surface, detectors on the inside surface may provide a higher resolution. A drawback to placing photosensors on the inside surface of the monolithic scintillation crystal is that the high energy photons may pass through such photosensors and associated electronics, which may absorb or scatter such high energy photons. In other embodiments, the monolithic scintillation crystals may be used for other purposes than PET, such as Single-photon emission computed tomography (SPECT).

A multiple of photosensors is provided for each monolithic scintillation crystal.

Faces of the monolithic scintillation crystal that are not optically coupled to another crystal and are not adjacent to photosensors may have a reflective or light absorbing coating. These faces may have a tapered shape.

In another embodiment, faces of the monolithic scintillation crystal that are not optically coupled to another crystal and are not adjacent to photosensors, may be coupled to optical glasses with a high refractive index (such as N-LaSF44 or sapphire). These optical glasses would be coupled to photosensor arrays, similar to the scintillation crystals, and are transparent the scintillation light generated in the neighboring scintillation crystals. The optical glasses may have a tapered shape.

While this invention has been described in terms of several preferred embodiments, there are alterations, permutations, modifications and various substitute equivalents, which fall within the scope of this invention. It should also be noted that there are many alternative ways of implementing the methods and apparatuses of the present invention. It is therefore intended that the following appended claims be interpreted as including all such alterations, permutations, modifications, and various substitute equivalents as fall within the true spirit and scope of the present invention.

The invention claimed is:

1. A high energy photon detector, comprising:
  a first scintillation crystal;
  a first plurality of photosensors on a first face of the first scintillation crystal, wherein the first plurality is at least two;
  a second scintillation crystal;
  a second plurality of photosensors on a first face of the second scintillation crystal, wherein the second plurality is at least two;
  an optical coupling interface between a second face of the first scintillation crystal and a second face of the second scintillation crystal, wherein the optical coupling interface provides an optical transmission between the first scintillation crystal and the second scintillation crystal.

2. The high energy photon detector, as recited in claim 1, wherein the refractive index of the optical interface between neighboring scintillation crystals is at least 1.0.

3. The high energy photon detector, as recited in claim 2, further comprising:
   a plurality of scintillation crystals;
   a plurality of photosensors, wherein each scintillation crystal of the plurality of scintillation crystals has at least two photosensors on a single face of each scintillation crystal, and wherein each scintillation crystal is optically coupled to at least two other scintillation crystals to form a ring or a cylinder.

4. The high energy photon detector, as recited in claim 3, wherein each scintillation crystal of the plurality of scintillation crystals is tapered.

5. The high energy photon detector, as recited in claim 4, wherein the first plurality of photosensors is at least four and the second plurality of photosensors is at least four.

6. The high energy photon detector, as recited in claim 5, further comprising a computer system, which generates tomographic images from data received from the first plurality of photosensors and the second plurality of photosensors.

7. The high energy photon detector, as recited in claim 6, wherein the first plurality of photosensors is at least sixteen and the second plurality of photosensors is at least sixteen.

8. The high energy photon detector, as recited in claim 7, wherein the computer system comprises:
   a processor;
   computer readable media, comprising:
      computer readable code for receiving data from the first plurality of photosensors, wherein the first plurality of photo sensors receive photons from scintillation photons from the first scintillation crystal and the second scintillation crystal;
      computer readable code for receiving data from the second plurality of photosensors, wherein the second plurality of photo sensors receive photons from scintillation photons from the first scintillation crystal and the second scintillation crystal;
      computer readable code for determining depth of interaction from the data from the first plurality of photosensors and the second plurality of photosensors; and
      computer readable code for generating a tomographic image from the data from the first plurality of photosensors and the second plurality of photosensors; and
   a display for displaying the tomographic images.

9. The high energy photon detector, as recited in claim 1, further comprising:
   a plurality of scintillation crystals; and
   a plurality of photosensors, wherein each scintillation crystal of the plurality of scintillation crystals has at least two photosensors on a single face of each scintillation crystal, and wherein each scintillation crystal is optically coupled to at least two other scintillation crystals to form a ring or cylinder.

10. The high energy photon detector, as recited in claim 9, wherein each scintillation crystal of the plurality of scintillation crystals is tapered.

11. The high energy photon detector, as recited in claim 1, wherein the first plurality of photosensors is at least four and the second plurality of photosensors is at least four.

12. The high energy photon detector, as recited in claim 1, wherein the first plurality of photosensors is at least four and the second plurality of photosensors is at least sixteen.

13. The high energy photon detector, as recited in claim 1, further comprising a computer, which generates tomographic images from data received from the first plurality of photosensors and the second plurality of photosensors.

14. The high energy photon detector, as recited in claim 13, wherein the controller comprises:
   a processor;
   computer readable media, comprising:
      computer readable code for receiving data from the first plurality of photosensors, wherein the first plurality of photo sensors receive photons from scintillation photons from the first scintillation crystal and the second scintillation crystal;
      computer readable code for receiving data from the second plurality of photosensors, wherein the second plurality of photo sensors receive photons from scintillation photons from the first scintillation crystal and the second scintillation crystal;
      computer readable code for determining depth of interaction from the data from the first plurality of photosensors and the second plurality of photosensors; and
      computer readable code for generating a tomographic image from the data from the first plurality of photosensors and the second plurality of photosensors; and
   a display for displaying the tomographic images.

15. The high energy photo detector, as recited in claim 1, wherein distribution of scintillation light created from an ionizing particle interaction in the first crystal is allowed to spread into the second crystal.

16. The high energy photon detector, as recited in claim 1, wherein the first crystal and second crystal are pressed firmly together with the optical coupling in between to provide the best optical transmission of light between the first and second crystal.

17. A method of forming a high energy photon detector, comprising:
   forming a first scintillation crystal and a second scintillation crystal;
   attaching at least two photosensors on a first face of the first scintillation crystal;
   attaching at least two photosensors on a first face of the second scintillation crystal;
   applying an optical interface on a second face of the first scintillation crystal; and
   attaching a second face of the second scintillation crystal to the optical interface at the second face of the first scintillation crystal.

18. The method, as recited in claim 17, further comprising:
   attaching a plurality of additional scintillation crystals between a third face of the first scintillation crystal and a third face of the second scintillation crystal to form a ring or cylinder, wherein the attaching additional scintillation crystals comprises applying an optical interface and clamping the scintillation crystals together; and
   attaching a plurality of photosensors to each of the additional scintillation crystals.

19. The method, as recited in claim 18, wherein each scintillation crystal is tapered.

* * * * *